(12) United States Patent
Shiomi et al.

(10) Patent No.: US 6,620,551 B1
(45) Date of Patent: Sep. 16, 2003

(54) POSITIVE PLATE CURRENT COLLECTOR FOR LEAD STORAGE BATTERY AND LEAD STORAGE BATTERY COMPRISING THE SAME

(75) Inventors: Masaaki Shiomi, Kyoto (JP); Hideki Tanaka, Kyoto (JP); Yuichi Tsuboi, Kyoto (JP); Yuichi Okada, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 34 days.

(21) Appl. No.: 09/786,750

(22) PCT Filed: Jul. 7, 2000

(86) PCT No.: PCT/JP00/04547

§ 371 (c)(1),
(2), (4) Date: May 10, 2001

(87) PCT Pub. No.: WO01/04976

PCT Pub. Date: Jan. 18, 2001

(30) Foreign Application Priority Data

| Oct. 14, 1999 | (JP) | 11-292811 |
| Oct. 15, 1999 | (JP) | 11-294087 |
| Jul. 9, 1999 | (JP) | 11-195437 |

(51) Int. Cl.[7] ................................................. H01M 4/66
(52) U.S. Cl. ........................ 429/245; 429/228; 429/234
(58) Field of Search ................................ 429/245, 228, 429/234

(56) References Cited

FOREIGN PATENT DOCUMENTS

| JP | 53-55745 | | 5/1978 |
| JP | 55-37739 | * | 3/1980 |
| JP | 57-103265 | | 6/1982 |
| JP | 60-37663 | | 2/1985 |
| JP | 62-47959 | | 3/1987 |
| JP | A-63-148557 | | 6/1988 |
| JP | 63-213264 | | 9/1988 |
| JP | 1-140557 | | 6/1989 |
| JP | 10-134810 | | 5/1998 |
| JP | 11-176438 | | 7/1999 |
| JP | 2000-58046 | | 2/2000 |
| JP | 2000-149981 | | 5/2000 |

\* cited by examiner

Primary Examiner—Laura Weiner
(74) Attorney, Agent, or Firm—Sughrue Mion, PLLC (57) ABSTRACT

A lead acid battery can be obtained which exhibits excellent life properties while keeping the level of self-discharging and electrolyte loss equal to that of those comprising a Pb—Ca alloy collector.

In other words, the present invention lies in a positive collector for lead acid battery comprising a substrate and a surface layer made of an alloy composition different from that of the substrate formed on at least a part of the surface of the substrate, characterized in that the substrate is a Sb-free lead alloy or lead and said surface layer is a lead alloy layer comprising one or more metals selected from the group consisting of alkaline metals and alkaline earth metals.

17 Claims, 5 Drawing Sheets

POSITIVE PLATE CURRENT COLLECTOR FOR LEAD STORAGE BATTERY AND LEAD STORAGE BATTERY COMPRISING THE SAME

TECHNICAL FIELD

The present invention relates to a lead acid battery.

BACKGROUND ART

As a collector for positive plate to be incorporated in a lead acid battery there has heretofore been used a Pb—Sb alloy. However, a battery using such an alloy is subject to drastic self-discharging or electrolyte loss and thus can hardly be used in the form of maintenance-free or valve-regulated battery. In order to inhibit self-discharging or electrolyte loss and hence render the battery maintenance-free, a Sb-free lead alloy such as Pb—Ca alloy comprising Ca in an amount of from 0.04 to 0.12 wt % has been used.

However, a battery comprising a positive collector made of a Sb-free lead alloy can be subject to capacity loss earlier than a battery comprising a Pb—Sb alloy. This is presumably attributed to poor adhesion between positive collector and active material, corrosion layer formed on collector which has high reactivity, and so on. Anyway, the battery comprising a Sb-free positive collector is disadvantageous in that the corrosion layer formed on the collector can easily discharge to form a passivated layer on the interface of the collector with the active material, making it impossible for the active material to sufficiently discharge.

Accordingly, in order to improve the life of the battery comprising a positive collector made of a Sb-free lead alloy, it is considered effective to improve the adhesion between the positive collector and the active material or form a corrosion layer which can hardly cause electric discharge. As one of approaches for improvement, it is proposed that a Pb-Sc alloy layer be formed on the on surface of a Pb—Ca alloy positive collector (JP-A-63-148557 (The term "JP-A" as used herein means an "unexamined published Japanese patent application")). It is known that the use of this approach makes it possible to prevent premature capacity loss and improve the resistance to electrolyte loss as compared with the battery comprising a collector made of a Pb—Sb alloy. However, even this approach is disadvantageous in that the collector used contains Sb, though only in the surface layer of the collector, which is dissolved with the electrolyte and deposited on the negative electrode to lower the hydrogen overvoltage, making it impossible to inhibit self-discharging or electrolyte loss as in Pb—Ca allay collector. In particular, the use of this approach in the use where charging is effected at a constant voltage is disadvantageous in that thermal runaway or drying-up (dry out) of electrolyte occurs to shorten the life of the battery.

Accordingly, the positive collector is required to exhibit (1) desired mechanical strength and workability, (2) corrosion resistance, (3) adhesion to active material, (4) resistance to passivation on the interface of collector with active material, (5) resistance to drop of hydrogen overvoltage on the negative electrode attributed to the positive electrode, and so on, on condition that it has a proper electrical conductivity.

An object of the invention is to provide a lead acid battery which satisfies the foregoing requirements as a whole of the positive collector and exhibits a prolonged life.

DISCLOSURE OF THE INVENTION

The foregoing object of the invention is accomplished with a collector for lead acid battery of the first embodiment of the present invention comprising a substrate and a surface layer which has an alloy composition different from that of the substrate and which is formed on at least a part of the surface of the substrate, characterized in that the substrate is a Sb-free lead alloy or lead and the surface layer is a lead alloy layer comprising one or more metals selected from the group consisting of alkaline metals and alkaline earth metals.

In the arrangement of the foregoing positive collector, the substrate mainly satisfies the desired mechanical strength, workability and corrosion resistance of the whole of the collector and the surface layer mainly improves the adhesion between the collector and the active material and resistance to passivation on the interface of the collector with the active material. Further, neither the substrate nor the surface layer contains Sb. Accordingly, the requirements for prevention of drop of hydrogen overvoltage on the negative electrode attributed to the positive electrode can be satisfied.

In the second embodiment, the positive collector for lead acid battery of the first embodiment comprises Ca in the surface layer in a content of from 0.2 to 5 wt %.

In the third embodiment, the positive collector for lead acid battery of the first embodiment comprises Mg in the surface layer in a content of from 0.1 to 5 wt %.

In the fourth embodiment, the positive collector for lead acid battery of the first embodiment comprises K in the surface layer in a content of from 0.1 to 5 wt %.

In the fifth embodiment, the positive collector for lead acid battery of the above embodiments comprises the surface layer further comprising a lead alloy comprising Sn in an amount of from 0.1 to 30 wt %.

In the sixth embodiment, the positive collector for lead acid battery of the above embodiments comprises the substrate comprising a lead alloy or lead metal comprising Ca in an amount of from 0 to 0.12 wt % and/or Sn in an amount of from 0 to 3 wt %.

In the seventh embodiment, the positive collector for lead acid battery of the above embodiments has the thickness of the surface layer of 1 µm or more and 30% or less of that of the substrate.

In the eighth embodiment, the positive collector for lead acid battery of the above embodiments comprises the surface layer which is formed on the surface of the positive collector to one sixth of surface area of the positive collector.

In the ninth embodiment, the positive collector for lead acid battery of the above embodiments comprises the collecting tab of the collector which is free of the surface layer at least on the point at which it is welded and integrated to a strap.

In the tenth embodiment, the positive collector for lead acid battery of the above embodiments comprises the positive collector which is a sheet-like lead alloy or lead or a grid obtained by expanding or punching a lead alloy or lead sheet.

In the eleventh embodiment, the positive collector for lead acid battery of the tenth embodiment is obtained by working an integrated lead alloy sheet prepared by rolling a laminate of lead alloy sheets having one or more metals selected from the group consisting of alkaline metals and alkaline earth metals on one or both surfaces of Sb-free lead alloy or lead substrate.

In the twelfth embodiment, the lead acid battery comprises a positive collector for lead acid battery of the above embodiments.

In the thirteenth embodiment, the lead acid battery of the twelfth embodiment comprises an active material comprising at least one alkaline metal or alkaline earth metal compound incorporated therein.

In the fourteenth embodiment, the lead acid battery of the fifth embodiment comprises an active material comprising an Sn compound incorporated therein.

In the fifteenth embodiment, in the lead acid battery of the thirteenth embodiment, as the starting material of active material a lead powder prepared from a lead alloy comprising alkaline metals or alkaline earth metals is used.

In the sixteenth embodiment, in the lead acid battery of the fourteenth embodiment, a lead powder prepared from a lead alloy comprising Sn is used as the starting material of active material.

In the seventeenth embodiment, in the lead acid battery of the twelfth embodiment, an electrolyte contains alkaline metal or alkaline earth metal ions.

In the eighteenth embodiment, the lead acid battery of the fifth embodiment comprises an electrolyte containing Sn ions.

BRIEF DESCRIPTION OF THE DRAWINGS

In these drawings, the reference numeral 1 indicates a surface layer and the reference numeral 2 indicates a substrate.

BEST MODE FOR CARRYING OUT THE INVENTION

In accordance with the present invention, a lead alloy layer comprising at least one selected from the group consisting of alkaline metals and alkaline earth metals is provided on the surface of a substrate of positive collector comprising Sb-free lead alloy or lead.

The provision of a lead alloy layer comprising at least one selected from the group consisting of alkaline metals and alkaline earth metals on the surface of the positive collector makes it possible to improve the adhesion between the positive active material and the positive collector and the morphology and composition of the positive collector corrosion layer and prevent the formation of passivated layer on the interface of the collector with the active material.

Referring to the content of alkaline metals or alkaline earth metals, the content of Ca, for example, is preferably from 0.2 to 5 wt %.

The content of Mg and K are each preferably from 0.1 to 5 wt %. Other alkaline metals or alkaline earth metals can exert similar effects when incorporated in the same amount as defined above. Two or more of these alkaline metals or alkaline earth metals can be used in combination to exert similar effects.

The greatest characteristic of the present invention is that a lead alloy layer comprising an alkaline metal or alkaline earth metal is provided on the surface of a positive collector. However, if an alkaline metal or alkaline earth metal is present in the entire collector, that is, if the collector is formed by a lead alloy comprising an alkaline metal or alkaline earth metal, the life of the storage battery is adversely affected by the properties of the alloy. A lead alloy comprising an alkaline metal or alkaline earth metal is advantageous in that it improves the strength of the positive collector when incorporated in a slight amount (from 0.04 to 0.12 wt % for Pb—Ca alloy). However, if the amount of such a lead alloy to be incorporated exceeds the above defined value, the resulting positive collector is disadvantageous in that it is more brittle and more subject to corrosion and thus cannot be used as a collector. In this respect, when such a lead alloy is present only in the surface layer, the entire collector has a sufficient strength and corrosion resistance even if the surface layer is brittle and subject to corrosion so far as the substrate has a sufficient strength and corrosion resistance because the strength and corrosion resistance of the entire collector depends on the properties of the substrate.

Since the alkaline metal or alkaline earth metal contained in the surface layer does not deposit on the negative electrode and lower the hydrogen overvoltage of the negative electrode as Sb does even if the surface layer is corrosion and dissolved with the electrolyte, self-discharging or electrolyte loss can be inhibited similarly to the case where a Pb—Ca alloy collector is used.

The provision of a lead alloy layer having a composition different from that of the substrate on the surface of the collector can be accomplished by various known techniques such as contact bonding, flame welding, dipping in molten lead alloy and electroplating.

The substrate is a matrix constituting the collector. The material to be used as the matrix in the invention is a Sb-free lead alloy or pure lead. The term "Sb-tree" as used herein means that Sb is not positively contained. For example, a lead alloy comprising Sb in an amount small enough to have little effect on the battery performances is not excluded from the invention. In some detail, the content of Sb in the substrate is preferably 1 wt % or less, more preferably 0.01 wt % or less. Even more preferably, the substantial content of Sb is 0 wt %. The Sb-free lead alloy is not specifically limited. In practice, however, Pb—Ca alloy comprising Ca as a main alloying component other than lead, Pb-Sn alloy comprising Sn as a main alloying component other than lead, Pb—Ca—Sn alloy comprising Ca and Sn as main alloying components other than lead, and so on, may be used. The content of Ca and Sn in these alloys are preferably 0.12 wt % or less and 3 wt % or less, respectively. Practical examples of the substrate include pure lead substantially free of metals other than lead. For example, when variation of the content of Ca and Sn within various practical ranges in a Pb—Ca—Sn alloy gives a result that the content of Ca and Sn should be substantially 0 wt %, the alloy means pure lead. Alternatively, a lead alloy obtained by adding to the foregoing alloy or pure lead elements which have heretofore been used to improve the properties of lead alloy such as Al, Ag, Se and Bi may be used. The thickness of the substrate in the finally prepared positive collector is preferably from 0.01 mm to 5 mm.

The incorporation of Sn in the surface layer in an amount of from 0.1 to 30 wt % in addition to the alkaline metal or alkaline earth metal makes it possible to improve the formability of the surface layer and the workability of the collector. It further can eliminate the dispersion of battery performances and improve the overdischarging performances. In addition to the alkaline metal or alkaline earth metal, elements which have heretofore been used to improve the properties of lead alloy such as Al, Ag, Se and Bi may be added.

When the thickness of the surface alloy layer is too small, the resulting effect is small. On the contrary, when the thickness of the surface alloy layer is too great, it is disadvantageous in that the producibility and workability of the collector are deteriorated and the resulting collector is more subject to corrosion. Accordingly, the thickness of the surface alloy layer is preferably 1 μm or more and 30% or less, more preferably 10% or less of that of the collector substrate. It is not necessary that the surface alloy layer cover the entire surface of the collector. It is preferred that the collector be covered by ⅙ or more of the apparent surface area thereof. Since such a surface layer is provided on the collecting tab of the collector, the collector is subject to corrosion at the portion at which the collecting tab is welded to the strap. Accordingly, it is preferred that such a surface layer be not provided on the portion which is welded and integrated to the strap.

The form of the collector is not specifically limited. From the standpoint of producibility or workability, the collector is preferably in the form of expanded grid, punched grid or sheet.

In the case where the collector according to the invention is used to form a lead acid battery, the incorporation of at least one of alkaline metals or alkaline earth metal compounds in the active material makes it possible to further improve the discharging performances and life of the battery. In the case where the surface layer contains Sn, the incorporation of an Sn compound in the active material makes it possible to further improve the discharging performances and life of the battery.

In the incorporation of an alkaline metal or alkaline earth metal compound in the active material, a lead powder prepared from a lead allay comprising an alkaline metal or alkaline earth metal may be used as a starting material of active material to exert similar effects. In the incorporation of a Sn compound in the active material, a lead powder prepared from a lead alloy comprising Sn may be used a starting material of active material to exert similar effects.

By adding a compound of alkaline metal or alkaline earth metal, e.g., sulfate thereof to the electrolyte so that alkaline metal or alkaline earth metal ions are present in the electrolyte, the life of the battery can be further prolonged. The amount of these alkaline metal or alkaline earth metal compounds to be incorporated is preferably from 0.001 to 0.3 mol/l as calculated in terms of metal ion concentration in the electrolyte. In the case where the surface layer contains Sn, the electrolyte can comprise an Sn compound, e.g., $SnSO_4$ incorporated therein so that Sn ions are present in the electrolyte to further prolong the life of the battery. The amount of the Sn compound to be incorporated is preferably from 0.001 to 0.1 mol/l as calculated in terms of Sn ion concentration in the electrolyte.

EXAMPLE

Examples of the present invention will be described hereinafter.

Example 1

An embodiment of the collector comprising a lead alloy substrate having the foregoing surface layer provided thereon will be described with reference to the case where the invention is applied to an expanded grid.

Figure 1:
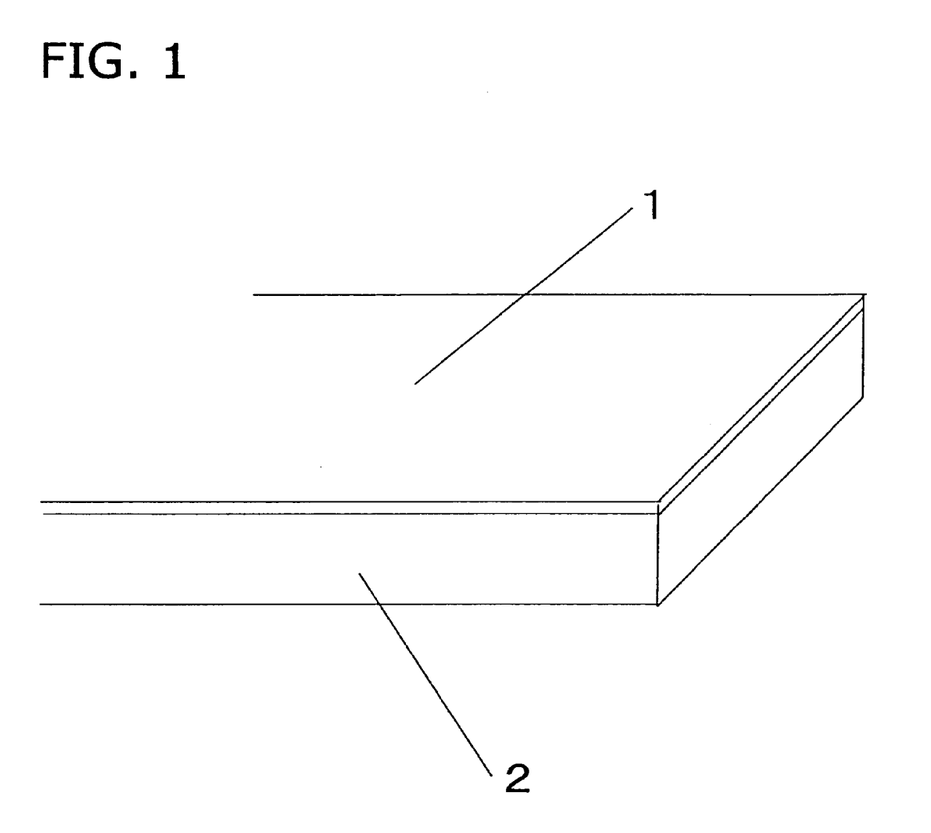
FIG. 1 is a perspective view illustrating an embodiment of a rolled sheet from which the collector according to the invention is prepared.
Figure 2:
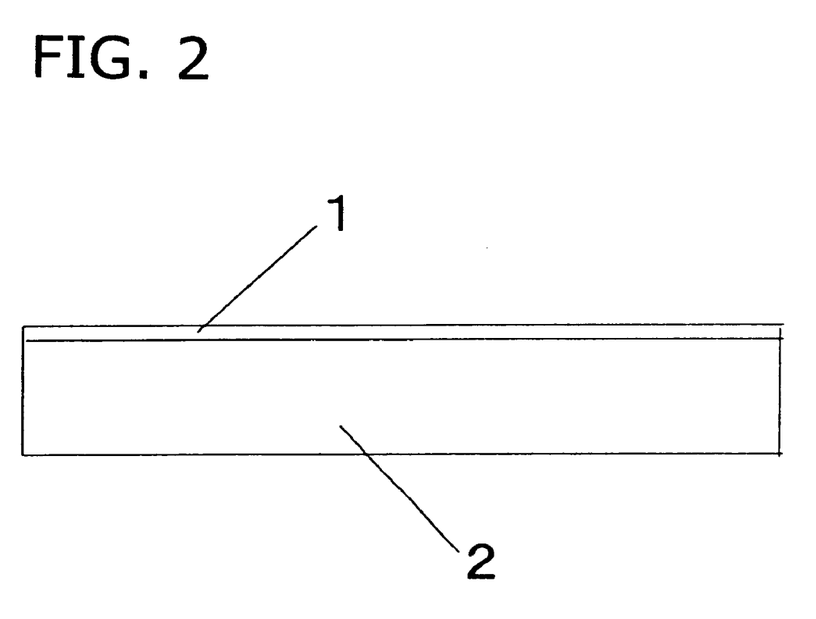
FIG. 2 is a perspective view illustrating another embodiment of a rolled sheet from which the collector according to the invention is prepared.

Firstly, on the surface (one side) of a continuously cast plate of a Pb-0.07 wt %Ca-1.3 wt %Sn alloy having a thickness of 10 mm as a substrate were each stacked Pb—Li, Pb—Na, Pb—K, Pb—Mg, Pb—Ca, Pb—Sr and Pb—Ba alloy sheets each having a thickness of 0.3 mm. These laminates were each rolled to prepare an integrated rolled sheet having a thickness of 1.0 mm. In this manner, a rolled sheet comprising a Pb-alkaline metal or alkaline earth metal alloy surface layer having a thickness of about 30 μm provided on one side of a substrate was prepared. This rolled sheet is shown in FIGS. 1 and 2. The amount of various elements to be incorporated in the lead alloy in the surface layer was 0.5 wt %.

Subsequently, the rolled sheet thus prepared was developed in the form of network by a reciprocal expanding machine to obtain a grid. The grid was filled with a paste prepared by kneading a lead powder with dilute sulfuric acid, cured, and then dried to prepare a positive plate. Five sheets of the positive plates and six sheets of negative plates prepared by a process which comprises filling a grid obtained by developing a Pb-0.07 wt %Ca-1.3 wt % Sn alloy rolled sheet having a thickness of 1.0 mm in the form of network by a reciprocal expanding machine with a paste prepared by kneading a lead powder mixed with ligninsulfonic acid, $BaSo_4$ and carbon with dilute sulfuric acid, curing the plates, and then drying the plates were then alternately stacked on each other with a fine glass fiber separator provided interposed therebetween to form a block of plates. The block of plates was then inserted in a battery container. Into the battery container was then injected a predetermined amount of dilute sulfuric acid. The block of plates was then subjected to formation to prepare a 2V-30Ah valve-regulated lead acid battery. The battery was then subjected to cycle life test at a temperature of 40° C. In some detail, discharging was effected at 10 A (1/3CA) for 1 hour, and charging was then effected at a constant current of 10 A until the battery voltage reached 2.45 V. Subsequently, charging was continued for 10 hours with the battery voltage being kept at 2.45 V. At every 50 cycles, capacity test was conducted at 10 A (1/3CA). For comparison, a grid comprising no such a surface layer provided on the substrate and a grid comprising a surface layer of Pb-5.0 wt %Sb alloy were similarly processed to prepare batteries which were then subjected to test. The batteries thus tested and the results of test are set forth in Table 1.

TABLE 1

| | | | Results of test | |
|---|---|---|---|---|
| | Positive grid | | Number | Electrolyte loss per |
| Battery No. | Substrate | Surface layer | of life cycles | 100 cycles (g) | Remarks |
|---|---|---|---|---|---|
| A | Pb- | None | 300 | 3.0 | Conventional |
| B | 0.07 wt % | Pb-5.0% Sb | 500 | 9.1 | Conventional |
| C | Ca- 1.3 wt % Sn | Pb-0.5% Li | 500 | 3.1 | Present invention |
| D | | Pb-0.5% Na | 500 | 2.9 | Present invention |
| E | | Pb-0.5% K | 500 | 3.2 | Present invention |
| F | | Pb-0.5% Mg | 600 | 2.9 | Present invention |

TABLE 1-continued

| Battery No. | Positive grid | | Number of life cycles | Electrolyte loss per 100 cycles (g) | Remarks |
|---|---|---|---|---|---|
| | Substrate | Surface layer | | | |
| G | | Pb-0.5% Ca | 600 | 2.8 | Present invention |
| H | | Pb-0.5% Sr | 500 | 3.1 | Present invention |
| I | | Pb-0.5% Ba | 500 | 3.2 | Present invention |

The batteries (C to I) prepared from a grid made of a sheet having a surface layer of the invention comprising an alkaline metal or alkaline earth metal provided on the surface thereof exhibited a life which is longer than that of the conventional battery (A) prepared from a grid made of a rolled sheet free of the foregoing surface layer on the substrate and equal to or longer than that of the battery (B) comprising a grid having a Pb—Sb alloy layer. The comparison of the loss of electrolyte in the various batteries during life test shows that the batteries (C to I) prepared from a grid of the invention exhibited an electrolyte lose which is the same as that of the battery free of surface layer and far smaller than that of the battery prepared from a grid having a Pb—Sb alloy surface layer formed thereon to advantageous.

The present example has been described with reference to the case where one alkaline metal or alkaline earth metal is added. However, similar effects can be exerted also when two or more of these metals are used in combination.

Example 2

Figure 3:
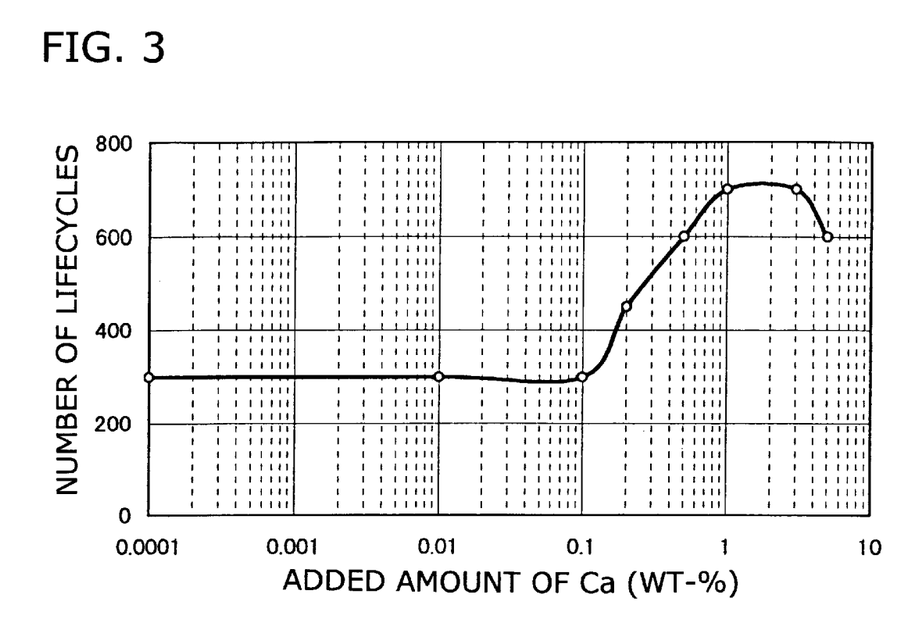
FIG. 3 is a graph illustrating the relationship between the content of Ca in the surface layer and the life of the storage battery.
Figure 4:
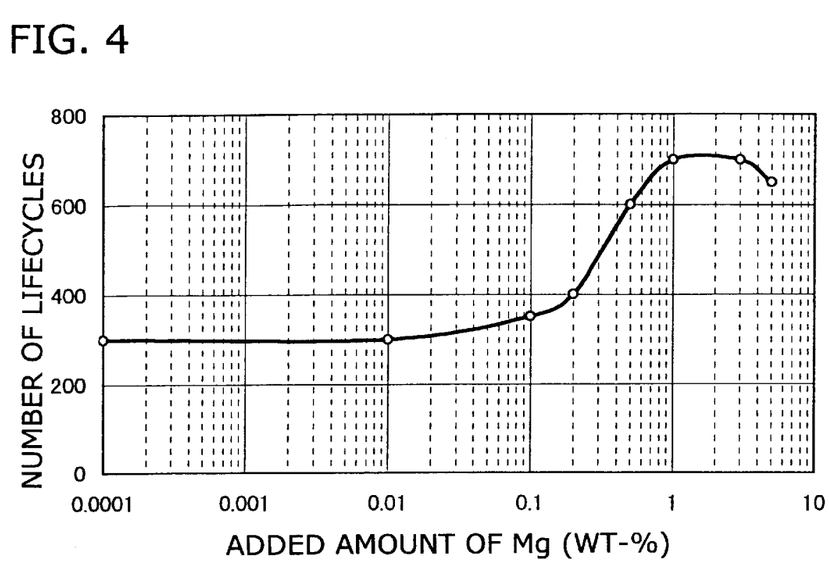
FIG. 4 is a graph illustrating the relationship between the content of Mg in the surface layer and the life of the storage battery.
Figure 5:
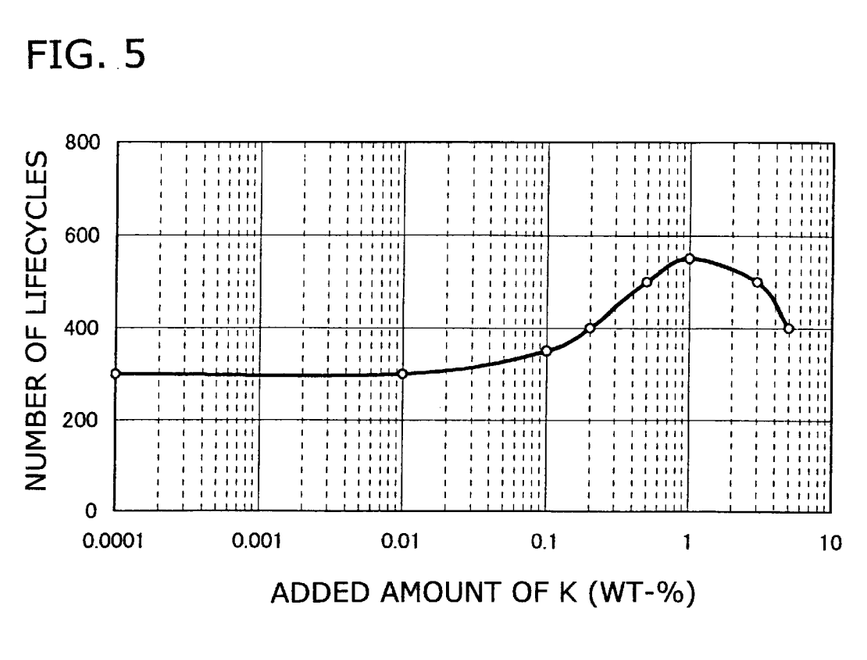
FIG. 5 is a graph illustrating the relationship between the content of K in the surface layer and the life of the storage battery.

An expanded grid prepared by processing in the same manner as in Example 1 except that the content of alkaline metal and alkaline earth metal was varied was used to prepare a 2V-30Ah valve-regulated lead acid battery which was then subjected to cycle life test under the same conditions as in Example 1. The relationship between the added amount of various elements and the number of life cycles is shown in FIGS. 3 to 5.

As can be seen in the results, in the case where a Pb-Ca alloy is used as the surface layer alloy, when the content of Ca falls within the range of from 0.2 to 5 wt %, the life of the battery can be remarkably prolonged. In the case where a Pb—Mg alloy or Pb—K alloy is used as the surface layer alloy, when the content of Mg or K falls within the range of 0.1 wt % or more, similar effects can be exerted.

Example 3

An example of the case where as the surface layer alloy there is used an alloy having Sn added to an alkaline metal or alkaline earth metal will be described.

Firstly, on the surface (one side) of a continuously cast plate of a Pb-0.07 wt %Ca-1.3 wt %Sn alloy having a thickness of 10 mm as a substrate was stacked Pb-1.5%Ca-10% Sn alloy sheet having a thickness of 0.1 mm. The laminate was rolled through pressure rolls to prepare an integrated rolled sheet having a thickness of 1.0 mm. In this manner, a rolled sheet comprising a Pb-1.5%Ca-10%Sn alloy surface layer having a thickness of about 10 μm provided on one side of a substrate was prepared. For comparison, a rolled sheet having a Pb-1.5%Ca alloy surface layer free of Sn was prepared in the same manner as mentioned above.

The foregoing alloy sheet as a surface layer was prepared by rolling a Pb-1.5%Ca-10%Sn alloy plate having a thickness of 2 mm or a Pb-1.5%Ca alloy plate having a thickness of 2 mm. The sheet prepared from Pb-1.5%Ca alloy underwent cracking during rolling while the sheet prepared from Pb-1.%Ca-10%Sn alloy did not undergo cracking during rolling. The integrated rolled sheet obtained by rolling a laminate of the alloy sheet as surface layer and a continuously cast plate of Pb-0.07 wt %Ca-1.3 wt %Sn alloy through pressure rolls was then observed. As a result, the sheet having a Pb-1.5%Ca alloy surface layer formed thereon was observed to have the surface layer peeled off at some area while the sheet having a Pb-1.5%Ca-10%Sn alloy was observed to have no surface layer peeled off and showed an excellent producibility and workability.

Subsequently, the rolled sheet thus prepared was developed in the form of network by a rotary expanding machine to prepare a grid. These grids were each filled with a paste prepared by kneading a lead powder with dilute sulfuric acid, cured, and then dried to prepare a positive plate. Five sheets of the positive plates and six sheets of negative plates prepared by a process which comprises filling a grid obtained by developing a Pb-0.07 wt %Ca-1.3 wt % Sn alloy rolled sheet having a thickness of 1.0 mm in the form of network by a rotary expanding machine with a paste prepared by kneading a lead powder mixed with ligninsulfonic acid, $BaSO_4$ and carbon with dilute sulfuric acid, curing the paste, and then drying the paste were then alternately stacked on each other with a synthetic resin separator provided interposed therebetween to form a block of plates. The block of plates was then inserted in a battery container. Into the battery container was then injected a predetermined amount of dilute sulfuric acid. The block of plates was then subjected to formation. Thus, 10 samples of 2V-30Ah vent type lead acid battery were prepared for each of the two examples, totaling 20 samples. These batteries were each discharged at 6 A (0.2 CA) to 1.7 V. The dispersion of capacity in these batteries was then examined. Some of the samples having a Pb-1.5%Ca alloy surface layer were found to have the surface layer peeled off at some area. These batteries had a capacity dispersion of about 1% at maximum. On the contrary, the samples having a Pb-1.5%Ca-10%Sn alloy surface layer were found to have no surface layer peeled off. These batteries had a capacity dispersion of about 0.3%.

The amount of Sn to be incorporated is preferably from 0.1 to 30%. When the amount of Sn falls below 0.1%, the resulting effect is insufficient. On the contrary, when the amount of Sn exceeds 30%, adverse effects such as poor formability of plate are exerted.

Example 4

An example of the case where the surface layer is not provided on the portion of the collecting tab in the collector which is welded and integrated to the strap will be described hereinafter.

Firstly, on the surface (both sides) of a continuously cast plate of Pb-0.06 wt %Ca-1.5 wt %Sn alloy having a thickness of 10 mm as a substrate was stacked a Pb-1.5 wt %Ca-10 wt %Sn alloy sheet having the same width as the substrate and a thickness of 0.2 mm. The laminate was then rolled through pressure rolls to prepare an integrated rolled sheet a having a thickness of 1.0 mm. In this manner, a rolled sheet having a Pb-1.5 wt %Ca-10 wt %Sn alloy surface layer having a thickness of about 20 $\mu$m on both sides of a substrate was prepared. The rolled sheet thus prepared was then developed in the form of network except the portion of collecting tab and upper edge by a rotary expanding machine to prepare an expanded grid a.

Subsequently, on the surface (both sides) of a continuously cast plate of Pb-0.06 wt %Ca-1.5 wt %Sn alloy having a thickness of 10 mm as a substrate was stacked a Pb-1.5 wt %Ca-10 wt %Sn alloy sheet having a thickness of 0.2 mm and a width smaller than that of the substrate by the amount corresponding to the length of the tab of the grid with one edge of the two sheets being flush with each other. The laminate was then rolled through pressure rolls to prepare an integrated rolled sheet b having a thickness of 1.0 mm. In this manner, a rolled sheet having a Pb-1.5 wt %Ca-10 wt %Sn alloy surface layer having a thickness of about 20 m provided on the entire both surfaces of a substrate except the area almost corresponding to the length of the tab of the grid was prepared. The rolled sheet was then expanded in the form of network by a rotary expanding machine, with the portion free of Pb-1.5 wt %Ca-10 wt % Sn alloy surface layer left as a collecting tab and the portion having said surface layer but to be an upper edge of the rolled sheet left unexpanded, to prepare an expanded grid b.

These grids were each filled with a paste prepared by kneading a lead powder with dilute sulfuric acid, cured, and then dried to prepare a positive plate. Five sheets of the positive plates and six sheets of negative plates prepared by a process which comprises filling a grid obtained by developing a Pb-0.07 wt %Ca-1.3 wt %Sn alloy rolled sheet having a thickness of 1.0 mm in the form of network by a rotary expanding machine with a paste prepared by kneading a lead powder mixed with ligninsulfonic acid, BaSO$_4$ and carbon with dilute sulfuric acid, curing the paste, and then drying the paste were then alternately stacked on each other with a separator provided interposed therebetween. A lead-1%Sn alloy was then welded to the tab of the grid to form a strap. Thus, a block of plates was prepared. The block of plates was then inserted in a battery container. Into the battery container was then injected a predetermined amount of dilute sulfuric acid to prepare a 2V-30Ah vent type lead acid battery.

These batteries were each overcharged at a temperature of 70° C. and 3 A (0.1 CA) for 1 month, and then disassembled to observe the conditions of the portion at which the collecting tab of the plate is welded to the strap. The results are set forth in Table 2.

TABLE 2

| Positive electrode | Expanded grid a | Expanded grid b |
|---|---|---|
| Conditions of welding of collecting tab of plate to strap | Corrosion found on the area at which strap is welded to collecting tab | Fair |
| Number of plates having collecting tab separated from strap | 2 | 0 |

The battery comprising the expanded grid a having a Pb-1.5 wt %Ca-10 wt %Sn alloy surface layer provided also on the collecting tab was found to have poor conditions on the area at which the strap is welded to the collecting tab and corrosion on the welded area. Some plates having the collecting tab separated from the strap were found. On the contrary, the battery comprising the expanded grid b having no Pb-1.5 wt %Ca-10 wt %Sn alloy surface layer provided on the collecting tab was found to have very good conditions on the area at which the strap is welded to the collecting tab.

The present example has been described with reference to the case where the collecting tab is almost free of surface layer. However, it is not always necessary that the collecting tab be almost free of surface layer. At least the area on the collecting tab which is welded and integrated to the strap can be free of the surface layer to exert similar effects.

The present example has been described with reference to the case where an expanded grid is prepared from a rolled sheet prepared such that no surface layer has been previously formed on the collecting tab. However, the surface layer which has been formed on the collecting tab can be removed by grinding or the like to exert similar effects.

Example 5

An example of the case where the active material to be incorporated in the battery comprising a collector having a surface layer provided thereon comprises an alkaline metal or alkaline earth metal incorporated therein or an Sn compound in addition thereto incorporated therein will be described hereinafter.

Firstly, pure Pb, Pb-1%Ca alloy and Pb-0.3%Ca-0.5%Sn alloy ingots were each cast, and then processed by a ball mill lead powder producing machine to prepare lead powders mainly composed lead monoxide, i.e., pure Pb powder, Pb-1% Ca alloy powder and Pb-0.3%Ca-0.5%Sn alloy powder. Subsequently, 1 kg of each of the pure Pb powder, Pb-1%Ca alloy powder and Pb-0.3%Ca-0.5%Sn alloy powder was mixed with 200 ml of a 23 wt % sulfuric acid to prepare a positive active material paste. 1 kg of the pure Pb powder, 10 g of CaO and 200 ml of a 23 wt % sulfuric acid were mixed to prepare a positive active material paste. 1 kg of the pure Pb powder, 10 g of SnSO$_4$ and 200 ml of a 23 wt % sulfuric acid were mixed to prepare a positive active material paste. The five positive active material pastes thus prepared were then used to fill a positive grid. As the positive grid there was used one obtained by expanding a Pb-0.07 wt %Ca-1.3 wt %Sn alloy sheet or a product of the invention obtained by expanding a Pb-0.07 wt %Ca-1.3 wt %Sn alloy substrate having a Pb-3 wt %Ca alloy surface layer or Pb-3 wt %Ca-10 wt %Sn alloy surface layer provided thereon. In this manner, 10 valve-regulated lead acid batteries (2v-30Ah) having different combinations of positive grid and positive active material paste were prepared. The batteries which were subjected to test are set forth in Table 3.

TABLE 3

| Battery No. | Positive grid Substrate | Positive grid Surface layer | Positive active material Lead powder | Positive active material Additive | Remarks |
|---|---|---|---|---|---|
| J | Pb- | None | Pure Pb | None | Conventional |
| K | 0.7 wt % Ca- | | | CaO | Conventional |
| L | 1.3 wt % Sn | | | SnSO$_4$ | Conventional |
| M | | | Pb-1 wt % Ca alloy | None | Conventional |
| N | | | Pb-0.3 wt % Ca-0.5 wt % Sn alloy | | Conventional |
| O | | Pb-3 wt % Ca | Pure Pb | | Present invention |
| P | | | | CaO | Present invention |
| Q | | | Pb-1 wt % Ca alloy | None | Present invention |
| R | | Pb-3 wt % Ca- | Pure Pb | SnSO$_4$ | Present invention |
| S | | 10 wt % Sn | Pb-0.3 wt % Ca-0.5 wt % Sn alloy | None | Present invention |

The 10 batteries thus prepared were each then subjected to discharge capacity test at 6 A (0.2 CA) and 90 A (3 CA). The batteries were each then subjected to cycle life test at a temperature of 40° C. In some detail, discharging was effected at 10 A (1/3CA) for 1 hour, and charging was then effected at a constant current of 10 A until the battery voltage reached 2.45 V. Subsequently, charging was continued for 10 hours with the battery voltage being kept at 2.45 V. At every 50 cycles, capacity test was conducted at 10 A (1/3CA). The results of test are set forth in Table 4.

TABLE 4

| Battery Name | 0.2 CA discharging test | 3 CA discharging test | Number of life cycles | Remarks |
|---|---|---|---|---|
| J | 4 hrs. 45 min. | 10 min. 11 sec. | 300 | Conventional |
| K | 4 hrs. 50 min. | 10 min. 20 sec. | 300 | Conventional |
| L | 4 hrs. 58 min. | 11 min. 01 sec. | 300 | Conventional |
| M | 4 hrs. 53 min. | 10 min. 22 sec. | 300 | Conventional |
| N | 5 hrs. 02 min. | 11 min. 16 sec. | 300 | Conventional |
| O | 4 hrs. 49 min. | 10 min. 20 sec. | 700 | Present invention |
| P | 4 hrs. 56 min. | 10 min. 39 sec. | 800 | Present invention |
| Q | 5 hrs. 01 min. | 10 min. 50 sec. | 800 | Present invention |
| R | 5 hrs. 09 min. | 11 min. 18 sec. | 800 | Present invention |
| S | 5 hrs. 12 min. | 11 min. 27 sec. | 800 | Present invention |

The combination of the grid according to the invention and CaO or SnSO$_4$ as an active material additive or a Pb-1%Ca alloy powder or Pb-0.3%Ca-1Sn alloy powder (Battery Name. P, Q, R, S) made it possible to improve the discharge capacity and life of the battery as compared with the single use of these components. This is presumably because the incorporation of an alkaline metal, alkaline earth metal or Sn in both the grid surface layer and active material causes the grid and the active material to be bonded to each other very firmly as compared with the incorporation of such an additive in any one of the grid and the active material, exerting an effect of improving the electrical conductivity of the plate, improving efficient reaction of active material, preventing the active material from softening and falling off from the plate and hence further improving the discharge capacity and life of the battery.

The present example has been described with reference to the combination of a grid having a Pb—Ca alloy or Pb—Ca—Sn alloy surface layer provided thereon with an active material paste having a Ca compound (CaO) or Sn compound (SnSO$_4$) incorporated therein or an active material paste prepared from a Pb—Ca alloy powder or Pb—Ca—Sn alloy powder. However, combinations with an alkaline metal or alkaline earth metal other than Ca can be used to exert similar effects.

Example 6

An example of the case where the electrolyte to be incorporated in the battery comprising a collector having a surface layer provided thereon comprises an alkaline metal, alkaline earth metal or Sn compound incorporated therein will be described hereinafter.

A positive grid prepared by expanding a Pb-0.07 wt %Ca-1.3 wt %Sn alloy sheet and a positive grid according to the invention prepared by expanding a Pb-0.07 wt %Ca-1.3 wt %Sn substrate having a Pb-3 wt %Ca alloy surface layer or Pb-3 wt %Ca-10 wt %Sn alloy surface layer provided thereon were each filled with a paste prepared by kneading a lead powder with dilute sulfuric acid, cured, and then dried to prepare a positive plate. These unformed positive plates and an unformed negative plate prepared by filling a grid prepared by expanding a Pb-0.07 wt %Ca-1.3 wt %Sn alloy rolled sheet having a thickness of 1.0 mm with a paste prepared by kneading ligninsulfonic acid, BaSO$_4$ and carbon, curing the material and then drying the material were subjected to formation in dilute sulfuric acid having a specific gravity of 1.05, washed with water, and then dried to prepare formed positive plates and negative plate. Five sheets of the formed positive plates thus prepared and six sheets of the formed negative plates thus prepared were then alternately stacked on each other with a fine glass fiber separator provided interposed therebetween to form a block of plates. The block of plates was then inserted in a battery container to prepare a battery before pouring electrolyte. Electrolytes were respectively obtained by dissolving NA$_2$SO$_4$ as an alkaline metal compound, MgSO$_4$ as an alkaline earth metal compound and SnSO$_4$ as an Sn compound in dilute sulfuric acid having a specific gravity of 1.30 in an amount of 0.05 mol/l. Each of the resulting electrolytes or dilute sulfuric acid having a specific gravity of 1.30 free of additives in a predetermined amount and in a predetermined amount was injected into the battery before pouring electrolyte. These batteries were each then charged at 0.1 CA for 10 hours to prepare ten 2V-30Ah valve-regulated lead acid batteries having different combinations of positive grid and electrolyte additives. The batteries were each then subjected to cycle life test at a temperature of 40° C. In some detail, discharging was effected at 10 A (1/3CA) for 1 hour, and charging was then effected at a constant current of 10 A until the battery voltage reached 2.45 V. Subsequently, charging was continued for 10 hours with the battery voltage being kept at 2.45 V. At every 50 cycles, capacity test was conducted at 10 A (1/3CA). The batteries thus tested and the results of test are set forth in Table 5.

TABLE 5

| Battery Name | Surface layer on positive grid | Electrolyte additive | Number of life cycles | Remarks |
|---|---|---|---|---|
| a | None | Na$_2$SO$_4$ | 300 | Conventional |
| b |  | MgSO$_4$ | 300 | Conventional |
| c |  | SnSO$_4$ | 300 | Conventional |
| d | Pb-3 wt % Ca | None | 700 | Present invention |
| e |  | Na$_2$SO$_4$ | 800 | Present invention |
| f |  | MgSO$_4$ | 800 | Present invention |
| g | Pb-3 wt % Ca | None | 700 | Present invention |
| h | –10 wt % Sn | Na$_2$SO$_4$ | 800 | Present invention |
| i |  | MgSO$_4$ | 800 | Present invention |
| j |  | SnSO$_4$ | 800 | Present invention |

The combination of a grid according to the invention with Na$_2$SO$_4$, MgSO$_4$ or SnSO$_4$ as an electrolyte additive (Battery Name e, f, h, i, j) made it possible to improve the battery life as compared with the single use of these components. This is presumably because the incorporation of an alkaline metal, alkaline earth metal or Sn in both the grid surface layer and active material causes the grid and the active material to be bonded to each other very firmly as compared with the incorporation of such an additive in any one of the grid and the active material, further improving the life of the battery.

The present example has been described with reference to the combination of a grid having a Pb—Ca alloy or Pb—Ca—Sn alloy surface layer provided thereon with an active material paste having Na$_2$SO$_4$, MgSO$_4$ or SnSO$_4$ incorporated therein. However, combinations with an electrolyte having other alkaline metal, alkaline earth metal or Sn compounds incorporated therein can be used to exert similar effects. The amount of Na$_2$SO$_4$ or MgSO$_4$ to be incorporated is preferably from 0.001 to 0.3 mol/l as calculated in terms of metal ion concentration in the electrolyte. The amount of SnSO$_4$ to be incorporated is preferably from 0.001 to 0.1 mol/l as calculated in terms of metal ion concentration in the electrolyte.

Examples 1 to 6 have been described with reference to the case where the invention is applied to an expanded grid as a collector. However, the present invention is not limited to expanded grid. The present invention can be applied to punched grid or sheet-like lead alloy collector to exert similar effects. Further, the surface layer can be formed by flame-spraying onto a cast grid, dipping in a molten lead alloy, electroplating, and so on, to exert similar effects.

Industrial Applicability

As mentioned above, the use of the present invention makes it possible to obtain a lead acid battery which exhibits excellent life properties while keeping the level of self-discharging and electrolyte loss equal to that of those comprising a Pb—Ca alloy collector.

What is claimed is:

1. A positive collector for lead acid battery comprising a substrate, a surface layer which has an alloy composition different from that of the substrate and which is formed on at least a part of the surface of the substrate, and a collecting tab, wherein the substrate comprises a Sb-free lead alloy or lead metal and the surface layer comprises a lead alloy layer comprising one or more metals selected from the group consisting of alkaline metals and alkaline earth metals, and the collecting tab is free of the surface layer at least on the point at which it is welded and integrated to a strap.

2. The positive collector for lead acid battery according to claim 1, wherein the content of Ca in said surface layer is from 0.2 to 5 wt %.

3. The positive collector for lead acid battery according to claim 1, wherein the content of Mg in said surface layer is from 0.1 to 5 wt %.

4. The positive collector for lead acid battery according to claim 1, wherein the content of K in said surface layer is from 0.1 to 5 wt %.

5. The positive collector for lead acid battery according to claims 1, 2, 3 or 4, wherein said surface layer comprises a lead alloy further comprising Sn in an amount of from 0.1 to 30 wt %.

6. A lead acid battery comprising a positive collector for lead acid battery according to claim 5, wherein an active material comprises an Sn compound.

7. The lead acid battery according to claim 6, wherein a lead alloy powder prepared from another lead alloy comprising Sn is used as a starting material of the active material.

8. A lead acid battery comprising a positive collector for lead acid battery according to claim 5, wherein an electrolyte contains Sn ions.

9. The positive collector for lead acid battery according to claims 1, 2, 3, or 4, wherein the substrate comprises a lead alloy or lead metal comprising Ca in an amount of from 0 to 0.12 wt % and Sn in an amount of from 0 to 3 wt %.

10. The positive collector for lead acid battery according to claims 1, 2, 3, or 4, wherein the surface layer is 1 µm or more and 30% or less of that of the substrate.

11. The positive collector for lead acid battery according to claims 1, 2, 3, or 4, wherein the surface layer is formed on the surface of the positive collector not less than one sixth of the surface area of the positive collector.

12. The positive collector for lead acid battery according to claims 1, 2, 3, or 4, wherein the positive collector is a sheet-like lead alloy or lead or a grid obtained by expanding or punching a lead alloy or lead sheet.

13. The positive collector for lead acid battery according to claim 12, which is obtained by working an integrated lead alloy sheet prepared by rolling a laminate of lead alloy sheets having one or more metals selected from the group consisting of alkaline metals and alkaline earth metals on one or both surfaces of a Sb-free lead alloy or lead substrate.

14. A lead acid battery comprising a positive collector for lead acid battery according to any one of claims 1 to 4.

15. The lead acid battery according to claim 14, wherein an active material comprises at least one alkaline metal or alkaline earth metal compound.

16. The lead acid battery according to claim 15, wherein a lead alloy powder prepared from another lead alloy comprising at least one alkaline metal or alkaline earth metal is,used as a starting material of the active material.

17. The lead acid battery according to claim 14, wherein an electrolyte contains at least one alkaline metal or alkaline earth metal ion.

* * * * *